US012560893B2

(12) United States Patent
Kurokawa

(10) Patent No.: US 12,560,893 B2
(45) Date of Patent: Feb. 24, 2026

(54) CLIP DEVICE AND ELECTRONIC TIMEPIECE

(71) Applicant: CASIO COMPUTER CO., LTD., Tokyo (JP)

(72) Inventor: Tomoyasu Kurokawa, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 356 days.

(21) Appl. No.: 18/369,024

(22) Filed: Sep. 15, 2023

(65) Prior Publication Data

US 2024/0103451 A1 Mar. 28, 2024

(30) Foreign Application Priority Data

Sep. 26, 2022 (JP) ................................. 2022-152623

(51) Int. Cl.
*G04G 17/06* (2006.01)
*G04C 10/02* (2006.01)

(52) U.S. Cl.
CPC ............. *G04G 17/06* (2013.01); *G04C 10/02* (2013.01)

(58) Field of Classification Search
CPC ........ G04G 17/06; G04G 19/00; G04C 10/02; H01R 13/73; H01R 13/62; H01R 13/631
See application file for complete search history.

(56) References Cited

U.S. PATENT DOCUMENTS

| | | | | |
|---|---|---|---|---|
| 2018/0366962 | A1* | 12/2018 | Dinan | H02J 50/10 |
| 2021/0313740 | A1 | 10/2021 | Brigham et al. | |
| 2022/0291635 | A1 | 9/2022 | Nagasawa et al. | |

FOREIGN PATENT DOCUMENTS

| | | | | |
|---|---|---|---|---|
| JP | 2020103633 A | | 7/2020 | |
| JP | 7102334 B2 | | 7/2022 | |
| JP | 2022139214 A | | 9/2022 | |
| JP | 7274106 B2 | | 5/2023 | |
| WO | WO-2023013272 A1 | * | 2/2023 | G04G 19/00 |

OTHER PUBLICATIONS

"PRO Trek Smart; Genuine holder to secure charging cable of PRO Trek Smart 'WSD-F20' released", Dream Seed; Accessed at https://www.dream-seed.com/weblog/wsd-f20-charging-holder-wsa-h1/; Published Sep. 11, 2018 and Updated Sep. 2, 2022.

"Purchase Review; Introducing GARMIN's smart watch 'Lily'!", Smareach; A blog introducing smart watch recommendations, comparisons, and reviews; Accessed at https://yakudat1.com/garmin-lily; published Jul. 4, 2023.

* cited by examiner

*Primary Examiner* — Edwin A. Leon
(74) *Attorney, Agent, or Firm* — Holtz, Holtz & Volek PC

(57) ABSTRACT

A clip device including a first lever having a connection terminal which comes in contact with and is connected to a terminal provided in an electronic device, and a second lever which is rotatably attached to the first lever and holds down a portion of the electronic device located on a side opposite to the terminal, in which the second lever is provided with a cutout portion, and the cutout portion is arranged at a position closer to a display area of a display of the electronic device than a position corresponding to the connection terminal of the first lever when the connection terminal of the first lever is connected to the terminal of the electronic device.

14 Claims, 10 Drawing Sheets

CLIP DEVICE AND ELECTRONIC TIMEPIECE

CROSS-REFERENCE TO RELATED APPLICATION

This application is based upon and claims the benefit of priority from the prior Japanese Patent Application No. 2022-152623, filed Sep. 26, 2022, the entire contents of which are incorporated herein by reference.

BACKGROUND

1. Technical Field

The present disclosure relates to a clip device and an electronic timepiece.

2. Description of the Related Art

For example, an arm wearable electronic device that is used by being worn on an arm is known which has a structure where a blood pressure measurement device has been mounted in a device main body that is worn on the arm by bands, as described in Japanese Patent Application Laid-open (Kokai) Publication No. 2020-103633.

This type of arm wearable electronic device includes a bracelet section which is provided on the back surface of the device main body and arranged between the bands and the arm, and is structured such that a charging terminal electrically connected to a circuit section in the device main body is provided on the bracelet section and covered and protected by one of the bands.

Also, this arm wearable electronic device is structured such that, when the power source of the circuit section in the device main body is to be charged by a charging clip device being connected to the charging terminal provided on the bracelet section, the band covering the charging terminal is detached from the device main body so that the charging terminal is exposed, and the bracelet section provided with the charging terminal is pinched by the charging clip device in this state.

SUMMARY

An embodiment in the present disclosure is a clip device comprising: a first lever having a connection terminal which comes in contact with and is connected to a terminal provided in an electronic device; and a second lever which is rotatably attached to the first lever and holds down a portion of the electronic device located on a side opposite to the terminal, wherein the second lever is provided with a cutout portion, and wherein the cutout portion is arranged at a position closer to a display area of a display of the electronic device than a position corresponding to the connection terminal of the first lever when the connection terminal of the first lever is connected to the terminal of the electronic device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of a clip device 1 in which the present disclosure has been applied will hereinafter be described with reference to FIG. 1 to FIG. 8.

Figure 1:
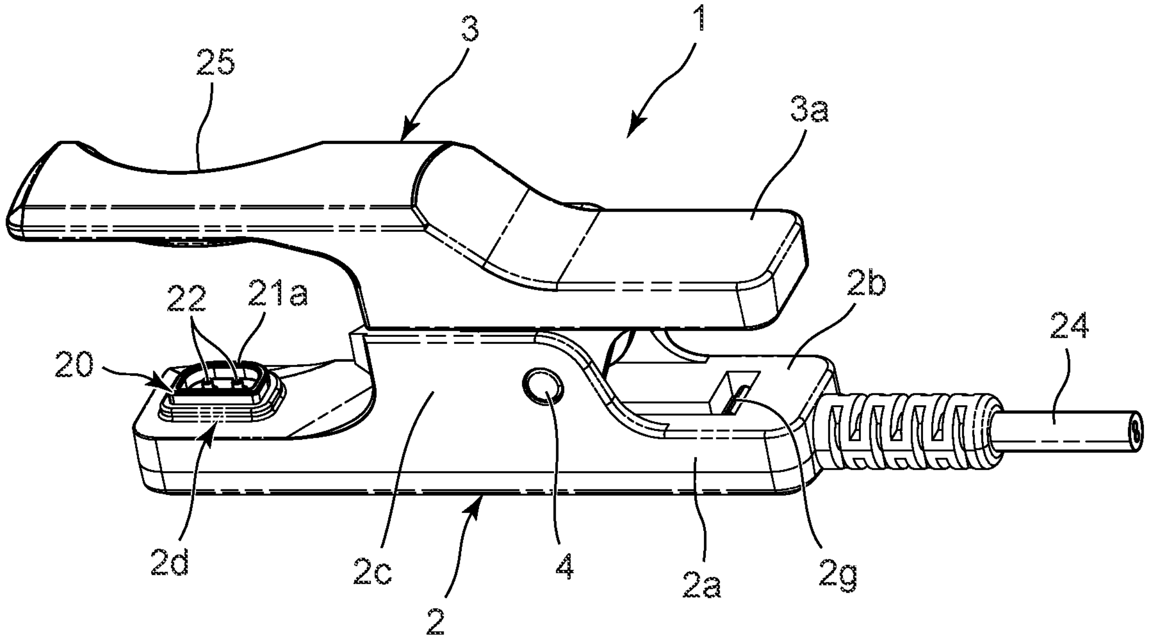
FIG. 1 is an enlarged perspective view of an embodiment of a clip device in which the present disclosure has been applied.
Figure 2:
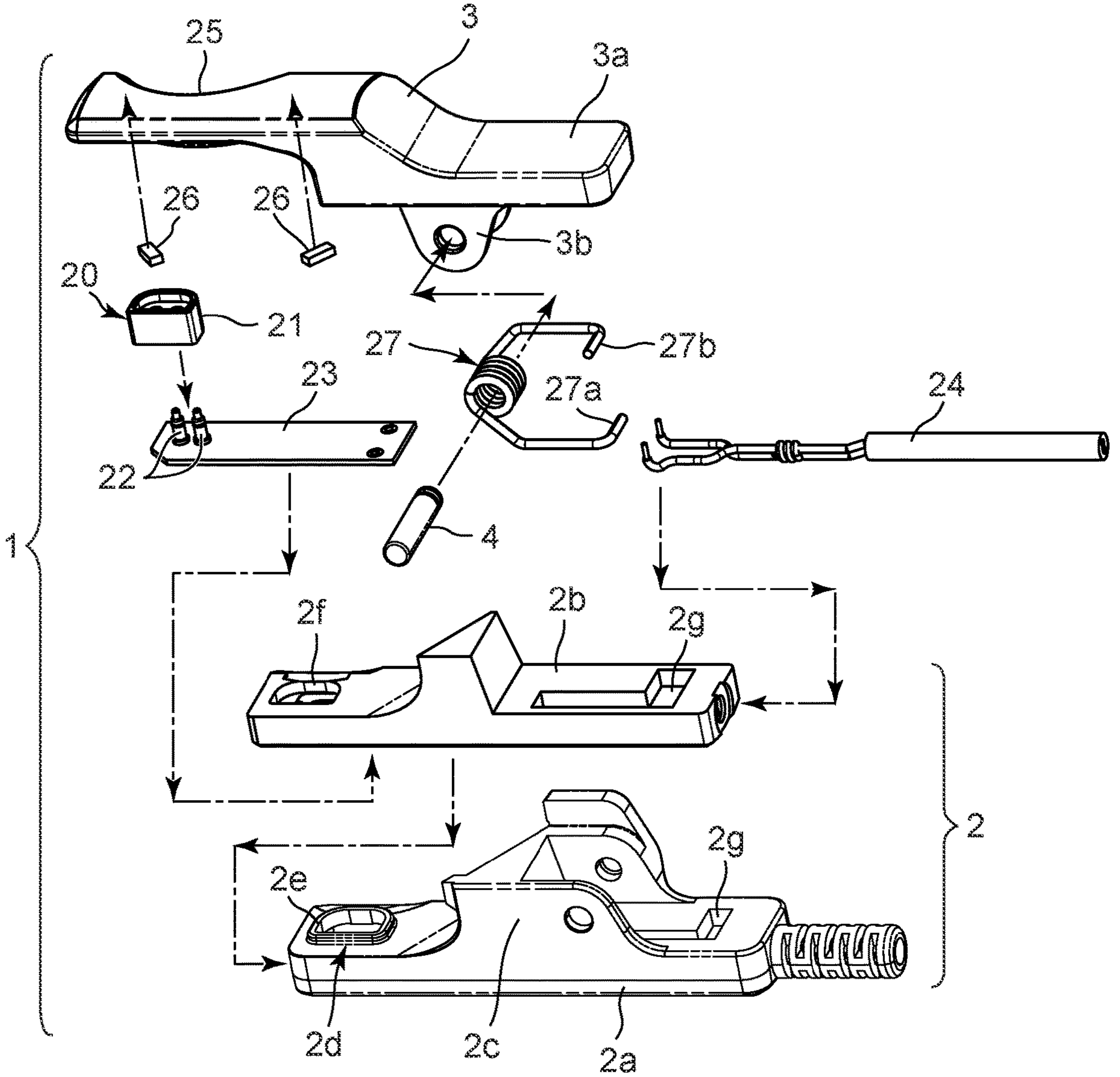
FIG. 2 is an exploded perspective view of the clip device shown in FIG. 1.
Figure 3:
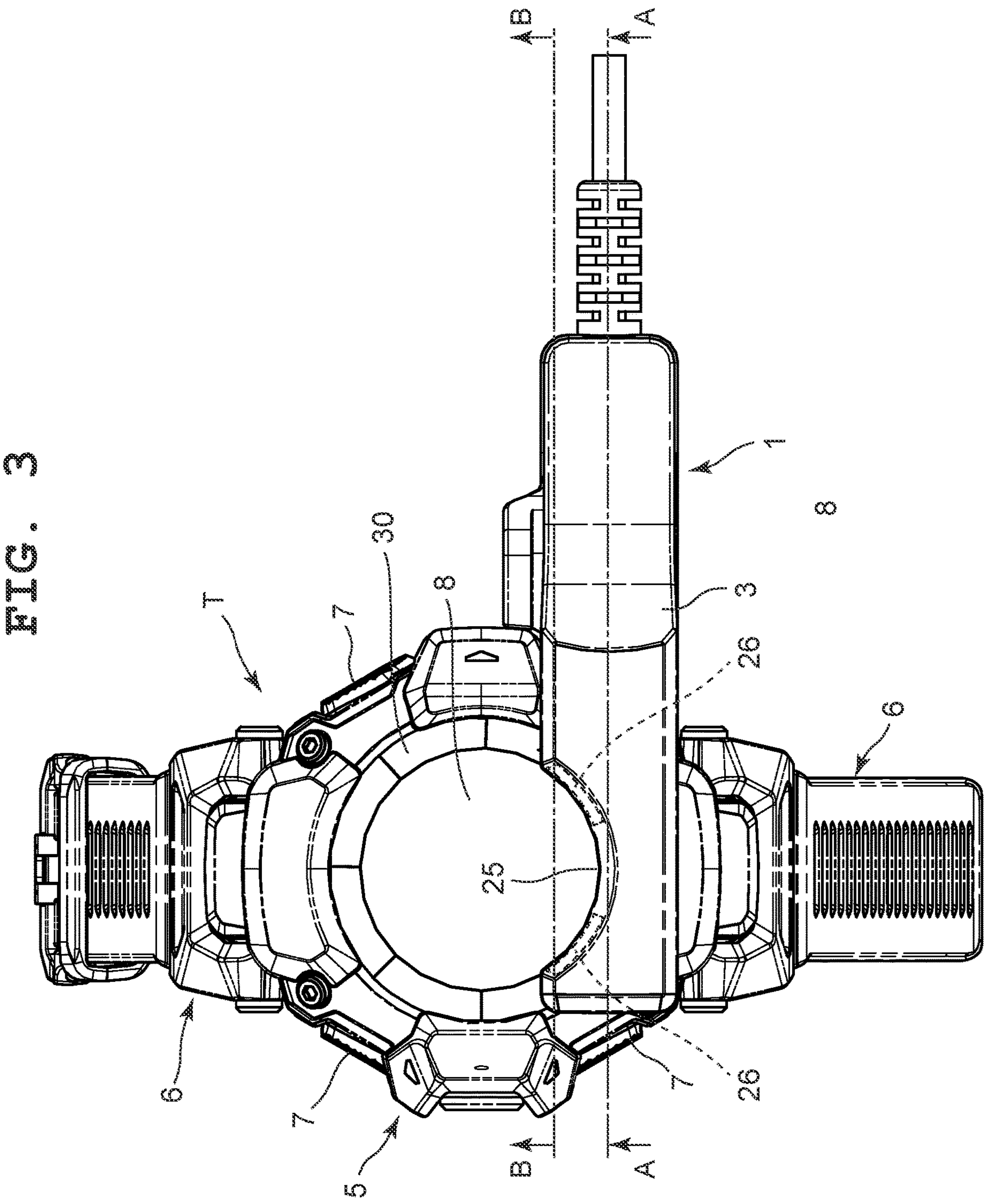
FIG. 3 is a planar view of a wristwatch pinched by the clip device shown in FIG.

This clip device 1 is an alligator-type charging device for charging a wristwatch P which is an electronic device, as shown in FIG. 3. Also, this clip device 1 includes a first lever 2 and a second lever 3 as shown in FIG. 1 and FIG. 2, and is structured such that the first lever 2 and the second lever 3 are rotatably connected to each other by a holding shaft 4 and the wristwatch P is held between the first lever 2 and the second lever 3 from the front and back directions (vertical directions) as shown in FIG.

On the other hand, the wristwatch T includes a wristwatch case 5, as shown in FIG. 3. To the six o'clock side and twelve o'clock side of the wristwatch case 5, watch bands 6 are attached. Also, on the two o'clock side, four o'clock side, eight o'clock side, and ten o'clock side of the wristwatch case 5, switch sections 7 are provided, respectively. Moreover, to the upper opening of the wristwatch case 5, a watch glass 8 is attached.

Figure 6:
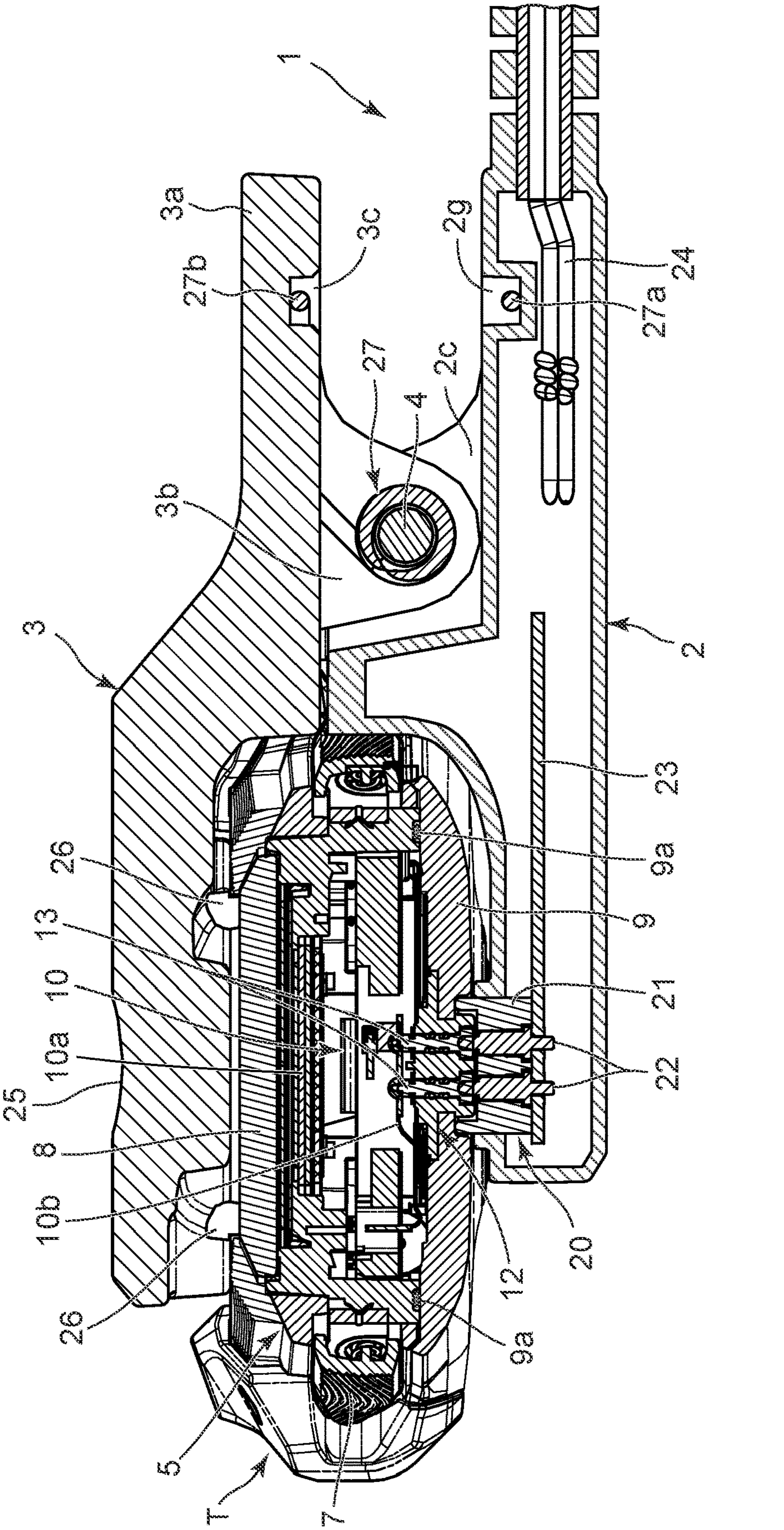
FIG. 6 is an enlarged sectional view of the clip device and the wristwatch taken along the A-A arrow view in FIG. 3.
Figure 7:
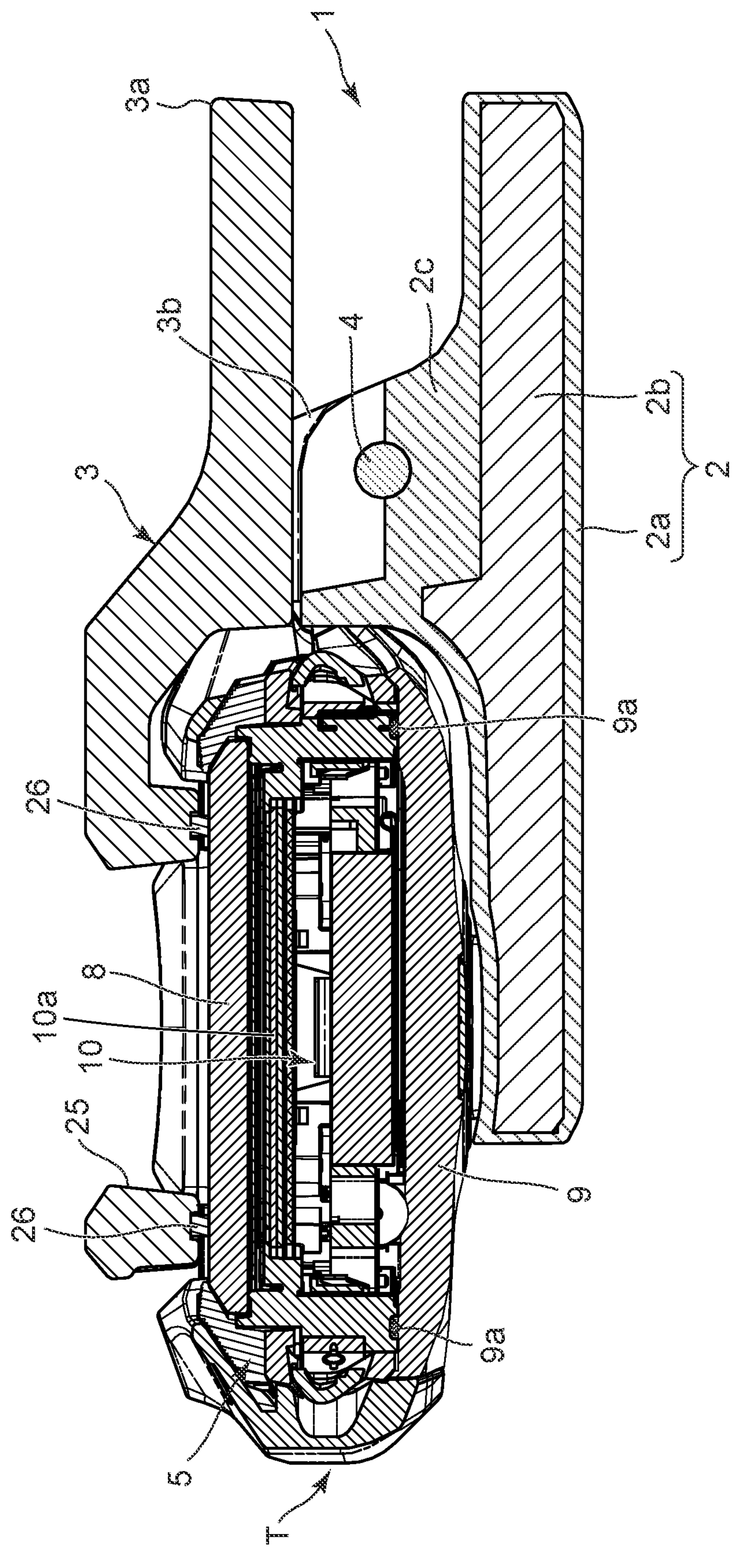
FIG. 7 is an enlarged sectional view of the clip device and the wristwatch taken along the B-B arrow view in FIG. 3.

In the wristwatch case 5, a timepiece module 10 is provided, as shown in FIG. 6 and FIG. 7, Although not shown in the drawings, this timepiece module includes various types of components required for timepiece functions, such as a timepiece movement which moves pointers to indicate the time, a display 10*a* which electro-optically displays information such as a time of day, a date, and a day of the week, a circuit section which electrically controls the timepiece movement and the display 10*a*, and a solar panel 30 (refer to FIG. 3) and a rechargeable battery which supply electric power to the circuit section. As the display 10*a* herein, a liquid crystal panel, an organic EL (Electro-Luminescence) panel, an OLED (Organic Light-Emitting Diode) panel, an electrophoretic display, and the like may be used.

To the lower part of the wristwatch case 5, a back cover 9 is attached by a plurality of screws 9*b* via a waterproof ring 9*a*, as shown in FIG. 4 to FIG. 7. This back cover 9 has a substantially rectangular plate shape whose three o'clock side and nine o'clock side project in arch shapes. A central portion of the back surface of the back cover 9 projects backward (downward in FIG. 6), and a sensor device 11 is provided in this projecting central portion.

Figure 4:
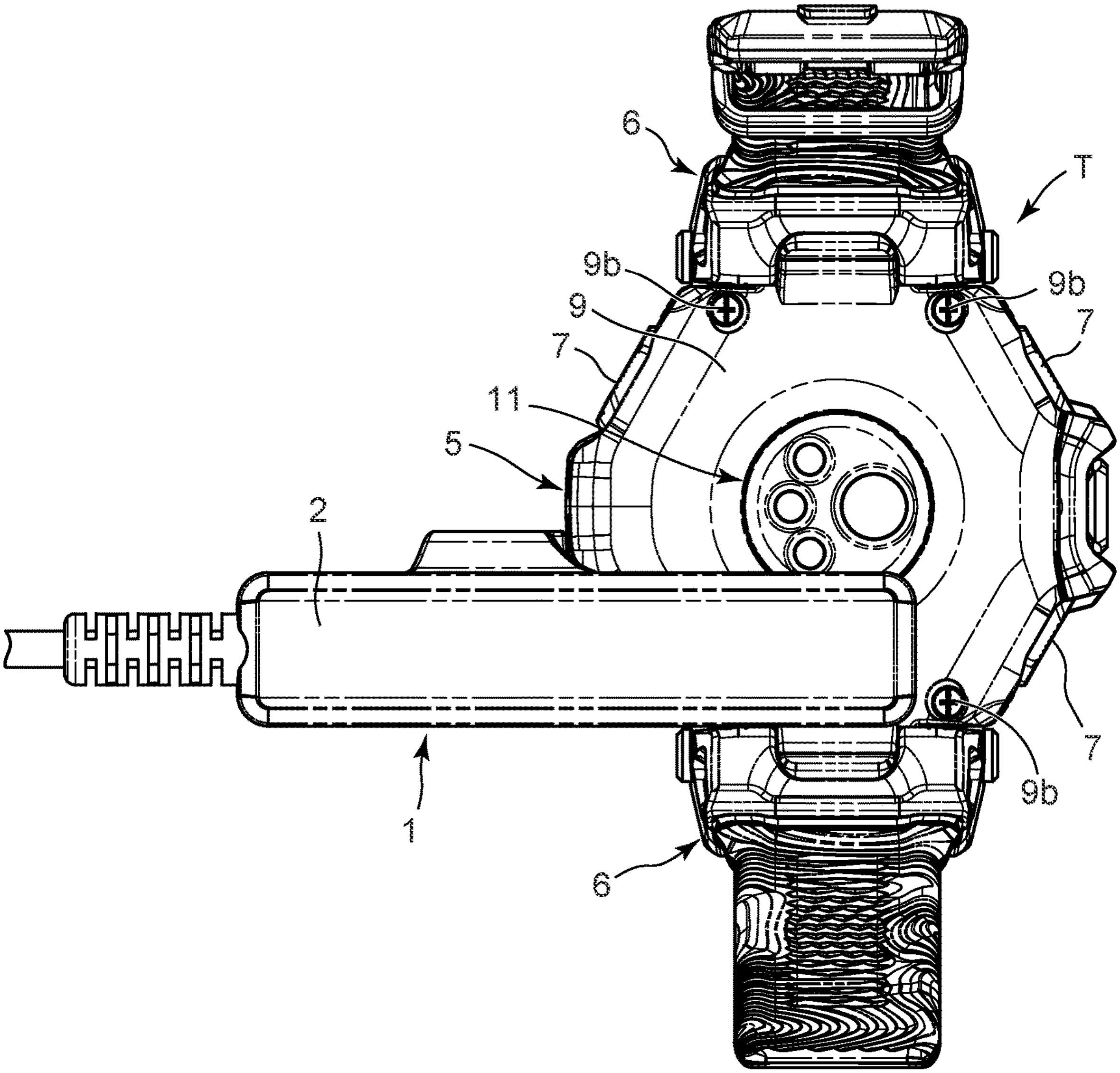
FIG. 4 is a back view of the wristwatch pinched by the clip device shown in FIG. 1.
Figure 5:
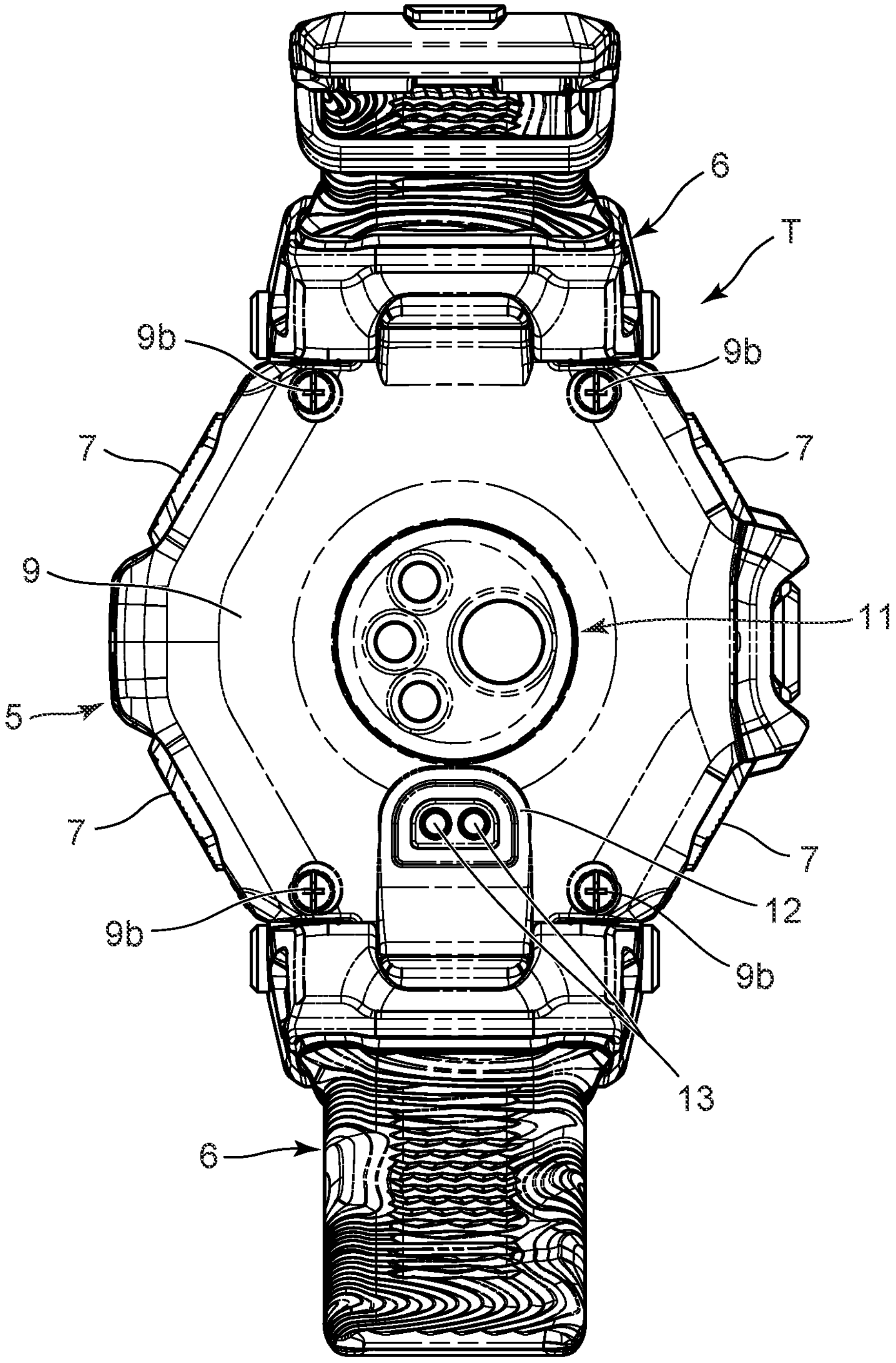
FIG. 5 is an enlarged back view of the wristwatch shown in FIG. 4.

The sensor device 11 includes an optical sensor which detects a pulse rate and oxygen saturation in blood, and is electrically connected to the circuit section (not shown in the drawings) of the timepiece module 10, as shown in FIG. 4 and FIG. 5. Although not shown in the drawings, this sensor device 11 is provided with a plurality of light emitting elements which emits light of a, green wavelength, light of a red wavelength, and light of an infrared wavelength, and a light receiving element which receives reflected light resulting from light emitted by these light emitting elements.

As a result, this sensor device 11 is structured such that light emitted by the plurality of light emitting elements is applied to blood vessels under the skin of an arm, reflected light resulting from the emitted light is received by the light receiving element, a pulse rate is detected on the basis of change in the received amount of reflected light of the green wavelength, and oxygen saturation in blood is detected on the basis of the ratio between transmitted light of the red wavelength and transmitted light of the infrared wavelength which have passed through the body, as shown in FIG. 4 and FIG. 5.

Figure 8:
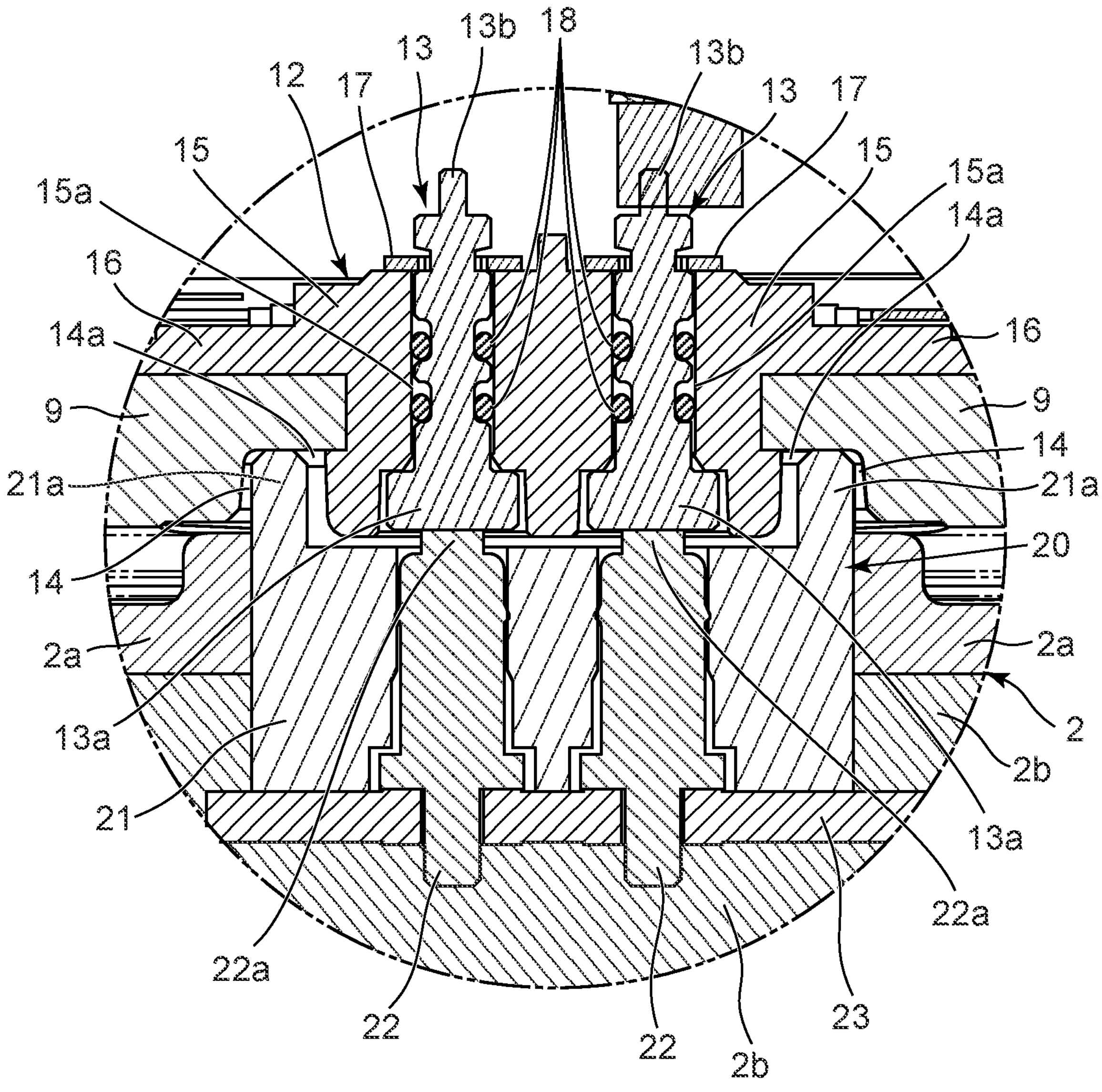
FIG. 8 is an enlarged sectional view of a connection part between the clip device and the wristwatch shown in FIG. 6.

On the other hand, on the six o'clock side of the hack cover 9, a terminal attachment member 12 is provided which has a plurality of charging terminals 13 attached thereto, as shown in FIG. 5, FIG. 6, and FIG. 8. The back cover 9 is made of carbon fiber resin acquired by carbon fiber that serves as reinforcement fiber being mixed into resin such as polyamide resin, and the terminal attachment member 12 is made of insulative resin material such as highly rigid polyamide resin or glass fiber resin, acquired by glass fiber being mixed into polyamide, resin.

In addition, on this six o'clock side of the back cover 9, an attachment hole 14 to which the terminal attachment member 12 is attached is provided penetrating vertically, as shown in FIG. 8. The terminal attachment member 12 includes a main body section 15 which is arranged in the attachment hole 14 of the back cover 9 and to which the plurality of charging terminals 13 is attached, and a flange section 16 formed on the outer circumferential part of the main body section 15.

In an area between the outer circumferential surface of the lower part of the main body section 15 and the inner circumferential surface of the attachment hole 14 of the back cover 9, a restriction recess section 14*a* is formed into which a frame-shaped projection section 21*a* on a connection body section 21 of a later-described connection terminal 20 of the clip device 1 is inserted, as shown in FIG. 8. Also, the flange section 16 is structured such that, when the main body section 15 is arranged in the attachment hole 14 of the back cover 9, the undersurface of this flange section 16 is arranged on the upper surface of the back cover 9. The back cover 9 and the terminal attachment member 12 are integrally formed by two-color molding.

The plurality of charging terminals 13 is each formed in a substantially round bar shape which is inserted into a plurality of through holes 15*a* formed in the main body section of the terminal attachment member 12, as shown in FIG. 8. More specifically, each charging terminal 13 is formed such that its outer diameter is substantially equal to the inner diameter of each through hole 15*a* of the main body section 15, and its vertical length is longer than the vertical length (thickness) of the main body section 15.

On the lower end of each of the plural charging terminals 13, a head section 13*a* is formed which has a large outer diameter so that each charging terminal 13 does not slip out, as shown in FIG. 8. Also, to an upper end portion of each of the plural charging terminals 13, a stopper member 17 such as an E-ring is attached. In addition, on the upper end of each of the plural charging terminals 13, a connection projection 13*b* is formed which has a short diameter and is electrically connected to the circuit section (not shown in the drawings) of the timepiece module 10 in the wristwatch case 5 by a connection member 10*b* such as a flexible wiring substrate, as shown in FIG. 6.

Moreover, on the outer circumferential surface of each of the plural charging terminals 13, a plurality of waterproof rings 18 is provided as shown in FIG. 8, and each waterproof ring 18 is structured such that its outer circumferential part comes in pressure contact with the inner circumferential surface of the corresponding through hole 15*a* of the main body section 15 so as to achieve waterproofing between the outer circumferential surface of each charging terminal 13 and the inner circumferential surface of each through hole 15*a* of the main body section 15.

In the present embodiment the clip device 1 is structured such that the first lever 2 and the second lever 3 rotatably connected to each other by the holding shaft 4 hold the wristwatch case 5 therebetween by the spring force of a spring 27 that is an energizing member, whereby this clip device 1 is attached to the wristwatch case 5, as shown in FIG. 1, FIG. 2, and FIG. 6.

The first lever 2 includes a main body lever 2*a* and an inner side lever 2*b*, and is structured such that the inner side lever 2*b* is arranged in the main body lever 2*a*, as shown in FIG. 2. On a substantially middle portion of the main body lever 2*a* in its longitudinal direction, a pair of first holding sections 2*c* to which the holding shaft 4 is attached is formed projecting upward.

This first lever 2 includes the connection terminal 20 which is connected to the plurality of charging terminals 13 provided in the terminal attachment member 12 of the back cover 9, as shown in FIG. 1, FIG. 2, FIG. 6, and FIG. 8. This connection terminal 20 is attached to a connection attachment section 2*d* provided on the first lever 2. The connection attachment section 2*d* includes a connection cover section 2*e* formed on the main body lever 2*a* and a connection housing section 2*f* formed in the inner side lever 2*h*.

Also, the connection terminal 20 includes the above-described connection body section 21 which is attached to the connection attachment section 2*d* of the first lever 2, and a plurality of electrode terminals 22 which is provided in the connection body section 21 and comes in contact with and electrically connected to the plurality of charging terminals 13 of the terminal attachment member 12, as shown in FIG. 1, FIG. 2, FIG. 6, and FIG. 8, The connection body section 21 is arranged in the connection housing section 2*f* in the inner side lever 2*h* of the first lever 2 and protrudes upward while being protected by the connection cover section 2*e* of the main body lever 2*a*.

On the outer circumferential part of an end of this protruding connection body sect ion 21, the frame-shaped projection 21*a* is provided projecting upward, as shown in FIG. 6 and FIG. 8. This frame-shaped projection 21*a* is formed such that the shape of its outer circumferential surface is the same as the shape of the inner circumferential surface of the attachment hole 14 of the back cover 9, and the shape of its inner circumferential surface is the same as the shape of the outer circumferential surface of the lower side of the main body section 15 of the terminal attachment member 12.

That is, this frame-shaped projection 21*a* is structured to be inserted from below the hack cover 9 into the restriction recess section 14*a* formed between the inner circumferential surface of the lower side of the attachment hole 14 of the back cover 9 and the outer circumferential surface of the lower side of the main body section 15 of the terminal attachment member 12, as shown in FIG. 6 and FIG. 8. As a result, the connection body section 21 is structured to fix the position of the first lever 2 with respect to the back cover 9 when the frame-shaped projection 21*a* on its end is inserted into the restriction recess section 14*a* formed between the inner circumferential surface of the lower side of the attachment hole. 14 of the back cover 9 and the outer circumferential surface of the lower side of the main body section 15 of the terminal attachment member 12.

The plurality of electrode terminals 22, which is connected to the plurality of charging terminals 13 of the terminal attachment member 12, is provided upright on a terminal substrate 23 and embedded in the connection body section 21 in, this state such that leading end sections 22*a* thereof protrude into the frame-shaped projection 21*a* of the connection body section 21, as shown in FIG. 2, FIG. 6, and FIG. 8. These leading end sections 22*a* of the plurality of electrode terminals 22 are formed using conductive resilient material.

As a result, the plurality of electrode terminals 22 is structured such that, when the frame-shaped projection 21*a* of the connection body section 21 is inserted into the restriction recess section 14*a* formed in the undersurface of the back cover 9, the leading end sections 22*a* are pressed against the undersurfaces of the head sections 13*a* on the lower ends of the plurality of charging terminals 13, and thereby resiliently deformed (compressive deformation) as shown in FIG. 6 and FIG. 8.

Also, the plurality of electrode terminals 22 is connected to an A/C (Alternating-Current) conversion section (not shown in the drawings) in the first lever 2 via the terminal substrate 23, as shown in FIG. 6 and FIG. 8. To this A/C conversion section, a power cord 24 is connected. As a result, the plurality of electrode terminals 22 is structured such that electric power transmitted through the power cord 24 is converted by the A/C conversion section, supplied to these electrode terminals 22 and then supplied to the plurality of charging terminals 13 of the terminal attachment member 12.

On the other hand, the second lever 3, which presses the wristwatch case 5 against the first lever 2 so that the wristwatch case 5 is held therebetween, is structured such that its second holding section 3*b* is arranged between the pair of first holding sections 2*c* of the first lever 2 and rotatably attached thereto by the holding shaft 4, as shown in FIG. 2, FIG. 6, and FIG. 7. This second holding section 3*h* is provided on the second lever 3 while projecting downward. On the second lever 3, a lever section 3*a* is formed projecting further rightward with respect to the holding shaft 4 in FIG. 6.

Also, in the second lever 3, an arc-shaped cutout section is formed at a position closer to the display area of the timepiece module 10 of the wristwatch case 5 than a position corresponding to the connection terminal 20 of the first lever 2, as shown in FIG. 3, That is, the inner circumferential part of this cutout section 25 is formed in an arc shape along the outer circumference of the display area of the wristwatch case 5. Note that the display area herein refers to the area where the pointers are moved by the timepiece movement of the timepiece module 10 and the area where information is displayed on the display 10*a*, which are located under the watch glass 8.

In the present embodiment, the timepiece module 10 includes the solar panel 30 whose outer shape is larger than that of the display area, and a print displaying section for displaying scale marks and modes is provided on the outer circumferential part of the watch glass 8 located above this solar panel 30, as shown in FIG. 3. Consequently, the above-described cutout section 25 is structured such that, when the connection terminal 20 of the first lever 2 is connected to the terminal attachment member 12 of the wristwatch case 5, a circumferential rim portion of the cutout section 25 is arranged along the inner circumference of the solar panel 30 which has the inner circumference and the outer circumference, and partially covers the solar panel 30.

As a result, the second lever 3 is structured such that, when the wristwatch case 5 is pressed against the first lever 2 by this second lever 3 and held therebetween, the inner circumferential surface of the cutout section 25 is arranged along the outer circumference of the display area of the timepiece module 10 in the wristwatch case 5, whereby information displayed in the display area of the timepiece module 10 can be viewed without the display area being covered, as shown in FIG. 3 and FIG. 6.

On side portions of the cutout section 25 in the second lever 3, or more specifically, on side portions of the cutout section 25 opposing each other via the connection terminal 20 of the first lever 2, cushioning members 26 are provided, as shown in FIG. 2, FIG. 6, and FIG. 7. These cushioning members 26 are structured to elastically come in contact with the upper surface of the watch glass 8 serving as the front surface of the wristwatch case 5 when the second lever 3 presses the wristwatch case 5 against the first lever 2 so that the wristwatch case 5 is held therebetween, whereby the upper surface of the wristwatch case. 5 and the upper surface of the watch glass 8 are not damaged.

In the present embodiment, the second lever 3 is forced to be rotated toward the first lever 2 by the spring 27 which is an energizing member provided on the holding shaft 4, as shown in FIG. 2 and FIG. 6. This spring 27 is a torsion spring provided on the outer circumferential part of the holding shaft 4. One end section 27*a* of this spring 27 is caught in a second catching groove 3*c* of the second lever 3, and the other end section 27*b* is caught in a first catching groove 2*g* of the first lever 2.

As a result, the clip device 1 is structured such that, when the lever section 3*a* of the second lever 3 is pressed against the spring force of the spring 27 the end portion of the second lever 3 on the side opposite to the lever section 3*a* is rotated in a direction away from the end portion of the first lever 2 on the connection terminal 20 side, whereby the space between the end portion of the first lever 2 and the end portion of the second lever 3 is enlarged so that the wristwatch case 5 is arranged between the end portion of the first lever 2 and the end portion of the second lever 3, as shown in FIG. 1, FIG. 5, and FIG. 7.

In addition, this clip device 1 is structured such that, when the wristwatch case 5 is arranged between the end portion of the first lever 2 on the connection terminal 20 side and the end portion of the second lever 3 on the side opposite to the lever section 3*a*, the end portion of the second lever 3 is rotated centering on the holding shaft 4 by the spring force of the spring 27, whereby the wristwatch case 5 is pressed against the end portion of the first lever 2, as shown in FIG. 2 and FIG. 6.

Moreover, this clip device 1 is structured such that, when the wristwatch case 5 is pressed against the first lever 2, the leading end sections 22*a* of the plurality of electrode terminals 22 are pressed against the undersurfaces of the head sections 13*a* at the lower ends of the plurality of charging terminals 13 of the terminal attachment member 12, and the rechargeable battery (not shown in the drawings) of the timepiece module 10 mounted in the wristwatch case 5 is charged in this state, as shown in FIG. 6 and FIG. 8.

Note that, in the structure of this clip device 1, a space is formed between the upper surface of the watch glass 8 and the undersurface of the second lever 3, as shown in FIG. 6, However, this space is not necessarily required to be formed. Also, in the structure of this clip device 1, the cushioning members 26 are not provided on a portion of the second lever 3 which is opposed to the front surface of the watch glass 8 and corresponds to the plurality of electrode terminal 22 and the plurality of charging terminals 13. However, the cushioning members 26 may be provided on this opposing portion. Moreover, in the structure of this clip device 1, on the second lever 3, the cushioning members 26 are provided on the side portions of the cutout section 25 between which the opposing portion is located, as shown in FIG. 6. However, the cushioning members 26 are not necessarily required to be provided on the side portions of the cutout section 25. By this structure, the degree of freedom in a design related to the positions of the cushioning members 26 is high.

Next, a case is described in which the wristwatch T is charged by the clip device 1.

In this case, first the lever section 3*a* of the second lever 3 of the clip device 1 is pressed against the spring force of the spring 27. As a result, the end portion of the second lever 3 on the side opposite to the lever section 3*a* is rotated around the holding shaft 4 in the direction away from the end portion of the first lever 2 on the connection terminal 20 side, whereby the space between the end portion of the first lever 2 and the end portion of the second lever 3 is enlarged.

In this state, the wristwatch case 5 is arranged between the end portion of the first lever 2 and the end portion of the second lever. In this arrangement, the frame-shaped projection 21*a* of the connection body section 21 protruding from the inner side of the first lever 2 to the outside is positioned corresponding to the restriction recess section 14*a* formed between the inner circumferential surface of the lower side of the attachment hole 14 of the back cover 9 on the back surface of the wristwatch case 5 and the outer circumferential surface of the lower side of the main body section 15 of the terminal attachment member 12.

In this state, the second lever 3 is rotated centering on the holding shaft 4 by the spring force of the spring 27, whereby the end portion of the second lever 3 on the cutout section side comes in contact with the upper surface of the watch glass 8 of the wristwatch case 5 and presses the wristwatch case 5 against the end portion of the first lever 2 on the connection terminal 20 side. As a result, the frame-shaped projection 21*a* of the connection body section 21 of the connection terminal 20 is inserted into the restriction recess section 14*a* formed between the inner circumferential surface of the lower side of the attachment hole 14 of the back cover 9 and the outer circumferential surface of the lower side of the main body section 15 of the terminal attachment member 12.

Here, the frame-shaped projection 21*a* is held by the restriction recess section 14*a* formed between the inner circumferential surface of the lower side of the attachment hole 14 of the hack cover 9 and the outer circumferential surface of the lower side of the main body section 15 of the terminal attachment member 12, whereby the position of the first lever 2 with respect to the back cover 9 of the wristwatch case 5 is fixed. Then, the leading end sections 22*a* of the plurality of electrode terminals 22 mounted in the connection body section 21 are pressed against the undersurfaces of the head sections 13*a* at the lower ends of the plurality of charging terminals 13 in the terminal attachment member 12.

As a result, the plurality of electrode terminals 22 of the clip device 1 is electrically connected to the plurality of charging terminals 13 of the terminal attachment member 12, Here, the arc-shaped cutout section 25 formed in the second lever 3 is arranged along the outer circumference of the display area of the wristwatch case 5. Therefore, information displayed in the display area of the timepiece module 10 is not covered by the second lever 3, and can be viewed through an area adjacent to the cutout section 25.

Also, here, the cushioning members 26 provided on the side portions of the cutout section 25 in the second lever 3 elastically come in contact with upper surface portions of the watch glass 8 of the wristwatch case 5 corresponding to the outer circumference of the display area of the timepiece module 10. Accordingly, by the cushioning members 26, the upper surface of the wristwatch case 5 and the upper surface of the watch glass 8 are not damaged when the second lever 3 pinches the wristwatch case 5 with the first lever 2.

When the plurality of electrode terminals 22 of the clip device 1 is electrically connected to the plurality of charging terminals 13 of the terminal attachment member 12, electric power from the power cord 24 is converted by the A/C conversion section (not shown in the drawings) in the first lever 2 and supplied to the plurality of electrode terminals 22 which has been connected to the A/C conversion section by the terminal substrate 23, Then, the electric power supplied to these electrode terminals 22 is supplied to the plurality of charging terminals 13 of the terminal attachment member 12 so as to charge the rechargeable battery (not shown) in the timepiece module 10 mounted in the wristwatch case 5.

In the case of the above-described arm wearable electronic device disclosed in Japanese Patent Application Laid-Open (Kokai) Publication. No. 2020-103633, charging operations by the charging clip device are complicated and troublesome. Accordingly, a structure is preferable in which the charging terminal is provided in and exposed on the back surface of the device main body, and a portion of the device main body corresponding to this exposed, charging terminal is pinched by the charging clip device for charging the power source. However, this structure has a problem in that, when pinching the device main body, the clip device positioned on the front surface of the device main body covers part of a display area in the device main body, whereby information displayed in the display area cannot be viewed.

In contrast, the clip device 1 of the present disclosure includes the first lever 2 having the connection terminal 20 which comes in contact with and is connected to the charging terminal. 13 of the terminal attachment member 12 which is a terminal section provided in the back cover 9 of the wristwatch case 5 of the wristwatch T which is an electronic device, and the second lever 3 which is rotatably attached to the first lever 2 and holds down the upper surface portion of the wristwatch case 5 located on the side opposite to the charging terminal 13. In the second lever 3, the cutout section 25 is formed such that, when the connection terminal 20 of the first lever 2 is connected to the terminal attachment member 12 of the wristwatch case 5, this cutout section 25 is arranged at the position closer to the display area of the wristwatch case than the position corresponding to the connection terminal of the first lever 2. As a result of this structure, the display area of the wristwatch case 5 is not covered, and the clip device 1 can be easily connected to the wristwatch T.

That is, in the case of this clip device 1, when the connection terminal 20 of the first lever 2 is positioned corresponding to the charging terminal 13 of the terminal attachment member 12 provided in the back cover 9 of the wristwatch case 5, and the wristwatch case 5 is held between the first lever 2 and the second lever 3, the cutout section formed in the second lever 3 is positioned in a manner to expose the display area of the wristwatch case 5. As a result of this structure, the display area of the wristwatch case 5 is not covered, and the connection terminal 20 of the first lever 2 and the charging terminal 13 of the wristwatch case can be easily and favorably connected to each other.

Also, in this clip device 1, the cutout section 25 is formed such that, when the connection terminal 20 of the first lever 2 is connected to the terminal attachment member 12 of the wristwatch case 5, this cutout section 25 is arranged along the outer circumference of the display area of the wristwatch case 5. As a result of this structure, when the wristwatch case 5 is held between the first lever 2 and the second lever 3, the cutout section 25 is positioned in consideration of the display area of the wristwatch case 5, whereby the display area is reliably and favorably exposed by the cutout section 25, and information displayed in the display area can be favorably viewed.

Also, this clip device 1 includes the spring 27 which is an energizing member for forcing the first lever 2 and the second lever 3 in directions to approach each other. As a result of this structure, the second lever 3 and the first lever 2 can reliably and favorably hold the wristwatch case 5 therebetween by the spring force of the spring 27.

Moreover, in the case of this clip device 1, the solar panel is arranged along the outer circumference of the display area of the wristwatch case 5, and the second lever 3 is provided in a manner to partially cover the solar panel 30 when the connection terminal 20 of the first lever 2 is connected to the terminal attachment member 12 of the wristwatch case 5. That is, it is unnecessary for the second lever 3 to be designed not to cover the solar panel 30, As a result of this structure, stable fixation can be achieved with a high degree of freedom in a design related to the second lever 3.

More specifically, in this clip device 1, the cutout section 25 is formed in the second lever 3 such that, when the connection terminal 20 of the first lever 2 is connected to the terminal, attachment member 12 of the wristwatch case 5, the circumferential rim portion of the cutout section 25 is arranged along the inner circumference of the solar panel 30 and partially covers the solar panel 30. That is, it is unnecessary for the second lever 3 to be designed not to cover the solar panel 30. As a result of this structure, stable fixation can be achieved with a high degree of freedom in a design related to the second lever 3.

Also, in this clip device 1, the cushioning members 26 are provided on the side portions of the cutout section 25 of the second lever 3 located opposing each other via the connection terminal 20 of the first lever 2. Accordingly, when the wristwatch case 5 is held between the first lever 2 and the second, lever 3, the cushioning members 26 elastically come in contact with the upper surface of the watch glass 8 which is the front surface of the wristwatch case 5, whereby the upper surface of the wristwatch case 5 and the upper surface of the watch glass 8 are not damaged. In the present embodiment, the outer circumferential portion of the cutout section 25 of the second lever 3 is formed in a manner to cover along the inner circumference of the solar panel 30, so that the cushioning members 26 can be formed large.

Also, this clip device 1 has the structure where the wristwatch case 5 having the display area corresponding to the display section is pinched from the user viewing side of the wristwatch case 5 and the opposite side, whereby the clip device 1 is fixed to the wristwatch case 5. That is, by this structure where the mutually opposing portions of the wristwatch case on the user viewing side and the opposite side are pinched, the clip device 1 can be fixed to the wristwatch case 5.

Here, in order to be stably fixed to the wristwatch case 5, the clip device 1 is required to be arranged in a manner to at least cover the portion of the wristwatch case 5 on the user viewing side which corresponds to the fixing portion of the wristwatch case 5 on the side opposite to the user viewing side. That is, not any portion but a specific portion of the wristwatch case 5 on the user viewing side is required to be pinched by the clip device 1 for the stable fixation, and this specific portion is constrained by the portion to be pinched on the side opposite to the user viewing side.

In addition, on the side opposite to the user viewing side of the wristwatch cases 5, the charging terminals 13 are provided. When this portion provided with the charging terminals 13 is to be pinched by the clip device 1, the portion of the wristwatch cases 5 on the user viewing side which corresponds to this portion provided with the charging terminals 13 is required to be pinched in order to stably fix the clip device 1 to the wristwatch case 5. That is, in the structure of the clip device 1, the first lever 2 and the second lever 3 which are positioned on the user viewing side of the wristwatch case 5 and the opposite side thereof are constrained by the arrangement positions of the charging terminals 13 in the wristwatch case 5 serving as a fixation target, that is, the portions of the wristwatch case 5 to be pinched. In other words, the arrangement positions of the charging terminals 13 of the wristwatch case 5 to which the clip device 1 is fixed have constraints.

However, within these constraints, this clip device 1 is connectable to the charging terminals 13 of the wristwatch case serving as a fixation target without covering the display area of the wristwatch case 5.

Figure 9:
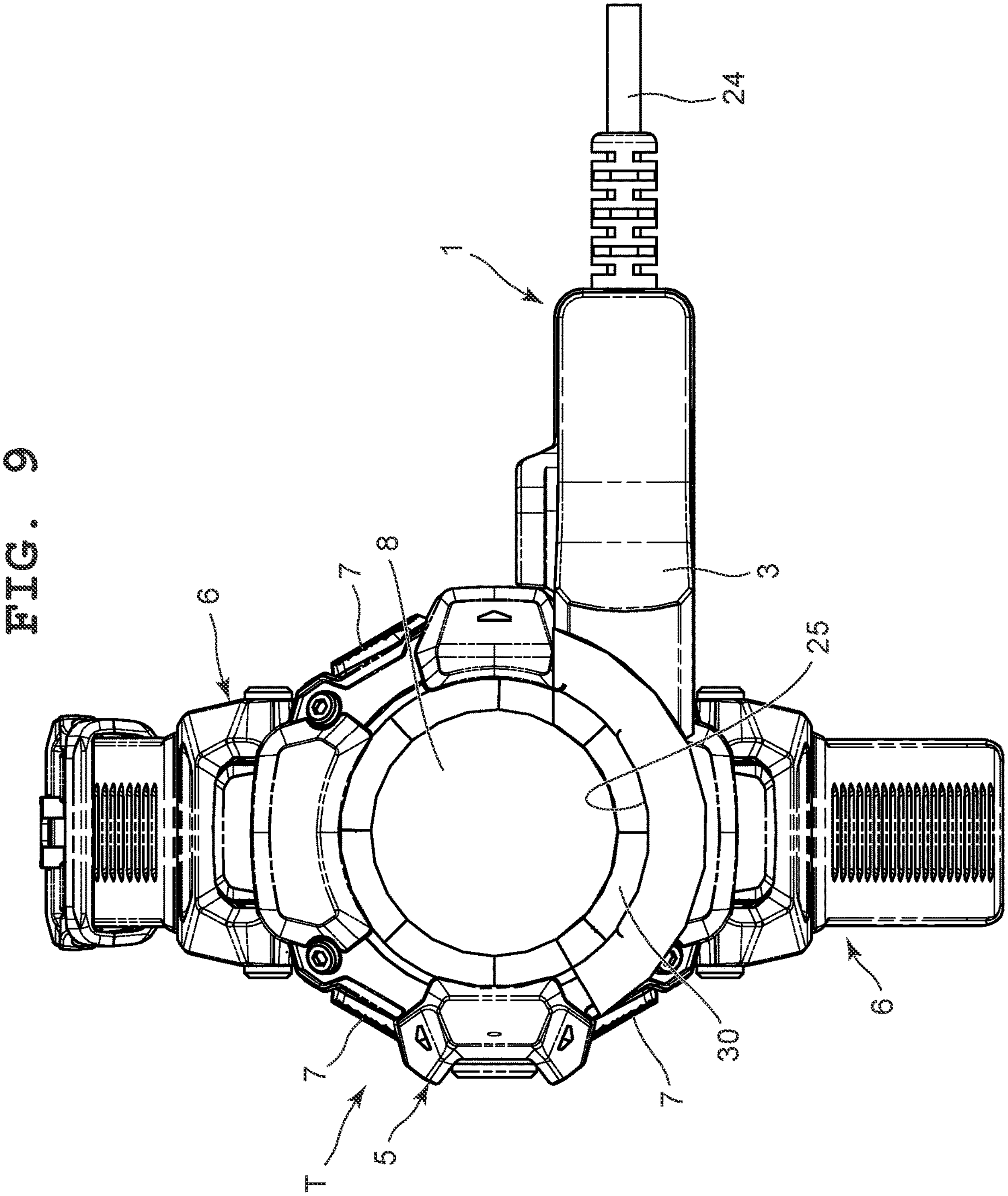
FIG. 9 is an enlarged planar view of a first modification example of the clip device in which the present disclosure has been applied.

In the above-described embodiment, the cutout section 25 in the second lever 3 is formed in an arc shape along the outer circumference of the display area of the wristwatch case 5. However, the present disclosure is not limited thereto. For example, a structure may be adopted in which the timepiece module 10 in the wristwatch case 5 includes the solar panel whose outer shape is larger than that of the display area, the print displaying section for displaying scale marks and modes is provided on the part of the watch glass 8 located above the solar panel 30, and the circumferential rim portion of the cutout section 25 is arranged along the outer circumference of the solar panel 30 when the connection terminal. 20 of the first lever 2 is connected to the terminal attachment member 12 of the wristwatch case 5, as a first modification example shown in FIG. 9.

Figure 10:
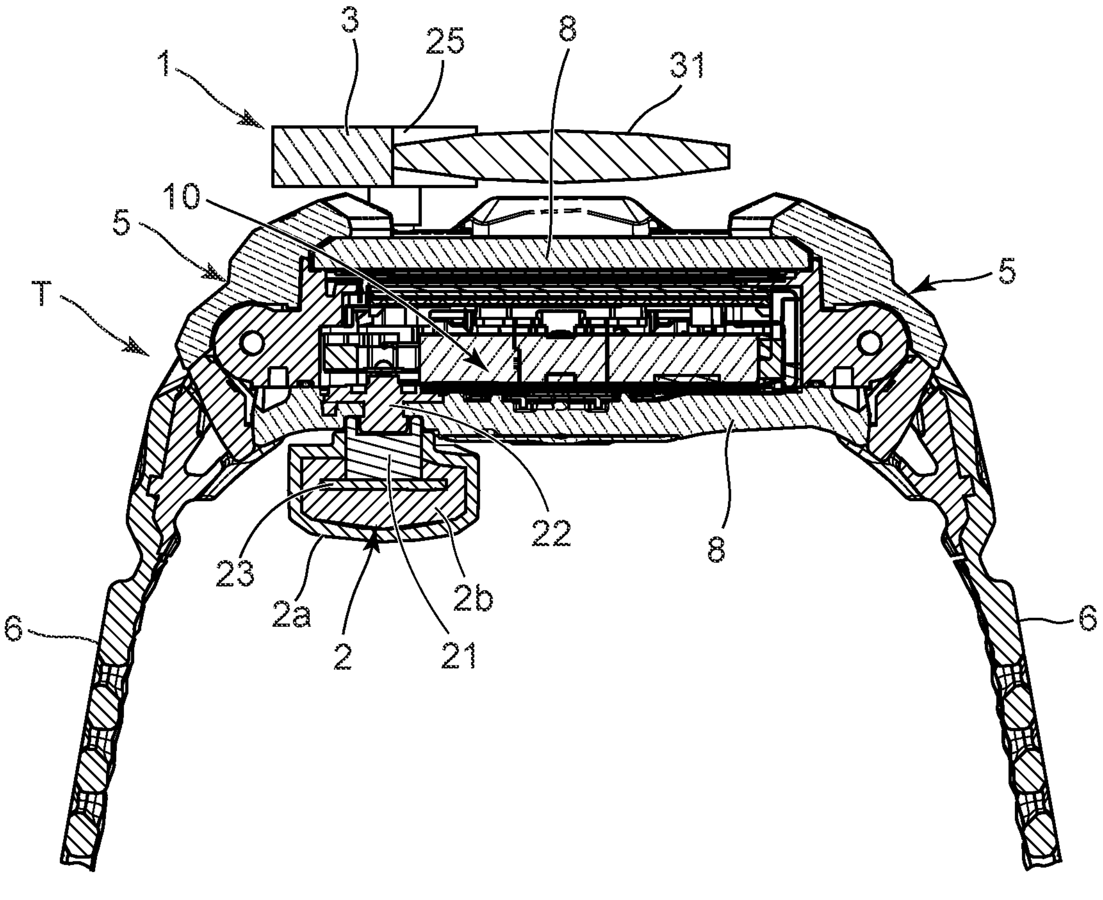
FIG. 10 is an enlarged sectional view of a second modification example of the clip device in which the present disclosure has been applied.

Also, in the above-described embodiment, the simple structure has been described in which the cutout section 25 is formed in the second lever 3. However, the present disclosure is not limited thereto, and a structure may be adopted in which a lens section 31 that is a convex lens is provided on the cutout section 25, as a second modification example shown in FIG. 10, By this structure, enlarged display of information in the display area can be performed by the lens section 31 provided on the cutout section 25.

Moreover, in the above-described embodiment, the present disclosure has been applied in a wristwatch. However, the present disclosure is not necessarily required to be applied in a wristwatch. For example, the present disclosure is applicable to electronic timepieces, arm wearable devices that are used by being worn on an arm, electronic devices such as cell-phones and portable information terminals.

While the present invention has been described with reference to the preferred embodiments, it is intended that the invention be not limited by any of the details of the description therein but includes all the embodiments which fall within the scope of the appended claims.

What is claimed is:

1. A clip device comprising:

a first lever having a connection terminal which comes in contact with and is connected to a terminal provided in an electronic device; and a second lever which is rotatably attached to the first lever and holds down a portion of the electronic device located on a side opposite to the terminal, wherein the second lever is provided with a cutout portion, and wherein the cutout portion is arranged at a position closer to a display area of a display of the electronic device than a position corresponding to the connection terminal of the first lever when the connection terminal of the first lever is connected to the terminal of the electronic device.

2. The clip device according to claim 1, wherein the cutout portion is arranged along outer circumference of the display area of the display when the connection terminal of the first lever is connected to the terminal of the electronic device.

3. The clip device according to claim 1, wherein the electronic device includes a solar panel arranged along outer circumference of the display area of the display, and wherein the second lever is provided in a manner to partially cover the solar panel when the connection terminal of the first lever is connected to the terminal of the electronic device.

4. The clip device according to claim 1, wherein the electronic device includes a solar panel having an inner circumference and an outer circumference, wherein the solar panel is arranged along outer circumference of the display area of the display, and wherein the cutout portion is provided in the second lever such that a circumferential rim portion of the cutout portion is arranged along the inner circumference of the solar panel and partially covers the solar panel when the connection terminal of the first lever is connected to the terminal of the electronic device.

5. The clip device according to claim 1, further comprising an energizing member which forces the first lever and the second lever in directions to approach each other.

6. The clip device according to claim 1, wherein one or a plurality of cushioning members is provided on the cutout portion of the second lever.

7. The clip device according to claim 1, wherein one or a plurality of cushioning members is provided on a portion of the second lever including side portions of the cutout portion opposing each other via the connection terminal of the first lever.

8. The clip device according to claim 1, wherein the cutout portion is arranged along outer circumference of a print displaying portion around the display area of the display of the electronic device when the connection terminal of the first lever is connected to the terminal of the electronic device.

9. The clip device according to claim 1, wherein the cutout portion is provided with a lens portion.

10. The clip device according to claim 1, wherein the electronic device is a timepiece.

11. An electronic timepiece comprising:

the terminal to which the connection terminal of the first lever of the clip device according to claim 1 is connected.

12. The electronic timepiece according to claim 11, further comprising:

a display provided at a position that is not covered by the second lever when the connection terminal of the first lever of the clip device is connected to the terminal.

13. The electronic timepiece according to claim 11, further comprising:

a solar panel provided at a position that is partially covered by the second lever when the connection terminal of the first lever of the clip device is connected to the terminal.

14. The electronic timepiece according to claim 11, further comprising:

a solar panel which has an inner circumference and an outer circumference and is arranged along outer circumference of a display area, wherein a circumferential rim portion of the cutout portion is arranged along the inner circumference of the solar panel when the connection terminal of the first lever of the clip device is connected to the terminal.

* * * * *